United States Patent Office 3,634,443
Patented Jan. 11, 1972

3,634,443
**CERTAIN 3,5-DIALKYLTHIOISOTHIAZOLE-
4-CARBONITRILES**
Karl Gunther Schmidt, Alfred Joos, Günther Mohr, and Gerhart Schneider, Darmstadt, Germany, assignors to Merck Patent Gesellschaft mit beschrankter Haftung, Darmstadt, Germany
No Drawing. Filed June 3, 1968, Ser. No. 733,753
Claims priority, application Germany, June 19, 1967, M 74,432
Int. Cl. C07d 91/42
U.S. Cl. 260—302 S          9 Claims

ABSTRACT OF THE DISCLOSURE

Herbicides and defoliating agents, such agents being particularly useful for suppressing the growth of monocotyledonous grasses at concentrations sufficiently low so as not to deleteriously affect corps, for example, the control of watergrass in rice fields, such agents being compounds of the formula:

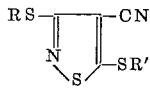

wherein R and R' each represents any of unsubstituted or substituted alkyl or alkenyl of up to 18 carbon atoms or alkynyl of up to 6 carbon atoms.

---

This invention relates to isothiazoles, and in particular to isothiazoles exhibiting selective herbicidal and/or growth suppressant activity, and/or defoliation activity.

One object of this invention, therefore, is to provide novel chemical compounds, processes for their production and novel intermediates therefor.

Another object is to provide compositions effective against undesired vegetation.

Another object is to provide methods of treating plants and plant-growing areas to inhibit or suppress undesired plant growth.

A further object is to provide methods of defoliating plants.

Upon further study of the specifications and claims, other objects and advantages of the present invention will become apparent.

To attain these objects there are provided compounds of Formula I, as follows:

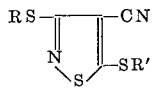

wherein R and R', being identical or different, represent alkyl of up to 18 carbon atoms, alkenyl of up to 18 carbon atoms, or alkynyl of up to 6 carbon atoms, as well as substituted derivatives thereof.

The above compounds exhibit herbicidal activity, in particular, and can be employed by themselves or in combination with other compounds used in agronomy and the like, especially with other herbicides.

The compounds of Formula I are particularly effective for combatting undesired mono-cotyledonous plants (weedy grasses), the most troublesome of these grasses being of the following genera: Agropyron, Agrotis, Alopecurus, Apera, Avena, Carex, Cynodon, Cyperus, Digitaria, Echinochloa, Imperata, Panicum, Paspalum, Poa, Scirpus, Setaria, Sorghum. By applying amounts of about 2.5 to 20 kg. per hectare of the compounds of this invention to the soil in the pre-germination process, the germination of growth of these grasses can generally be avoided. Of special importance is that these dosages are generally tolerated by cultivated plants (e.g. rice) without substantial deleterious effects, if any.

By applying higher amounts (e.g. 3 to 30 kg.) of these compounds to the soil, it is also possible to inhibit longitudinal development of germinated young plants. Finally, by the utilization of still larger amounts of up to 100 kg. per hectare, there is obtained a general suppression of plant growth.

Employed in the post-germination method, the compounds of Formula I inhibit the further development of several types of plants. Also, compounds of this invention are useful for defoliating purposes (e.g. in Malus sp.), which is particularly unexpected as herbicides are otherwise generally unsuited; rather, only a few, often unsatisfactory, defoliants are available.

Preferred compounds for defoliation purposes include, but are not limited to, 3,5-diethylmercapto-isothiazole-4-carbonitrile.

With respect to weed suppression, the compounds of Formula I are of economic importance for the reduction of grasses in rice, corn and grain fields, for example, Panicum crus-galli (watergrass, the most important weed in rice cultures), Digitaria spp., Setaria spp., and Sorghum spp. By virtue of the present invention, it is now possible (apparently for the first time) to control such grasses before their germination by applying the compound of Formula I on or into the soil, without damaging the seeded or already germinated or planted rice cultures.

The effects of the compounds of Formula I are convincingly demonstrated in the following tests, using 3,5-diethylmercapto-isothiazole-4-carbonitrile (A) as an example, the following known substances being employed for purposes of comparison:

B=[5-isopropl-2-methyl-4-(piperidinocarbonyloxy)-phenyl]-trimethylammonium chloride
C=2-chloroethyl-trimethylammonium chloride
D=2,4-dichlorobenzyl-tributylphosphonium chloride
E=maleic acid hydrazide

EXPERIMENT 1

Into Petri dishes lined with a double layer of filter paper, there are introduced per dish 3 ml. of an acetone solution of one of the aforesaid agents. After the acetone was evaporated, the double filter was moistened with 3 ml. of water. Respectively, 20 seed grains of cress (*Lepidium sativum*) and oats (*Avena sativa*) were then imbedded. Seven (Lepidium) and nine days (Avena) thereafter, respectively, the development of the seedlings was evaluated; in this connection, the inhibition of root (W) and shoot (S) was evaluated separately with respect to controls.

The following designations are employed:

0=no inhibition, normal growth;
1=slight inhibition;
2=strong inhibition;
3=very strong inhibition (growth almost completely suppressed).

the dishes were sprayed from above with an aqueous dilution of a 25% emulsion concentrate of compound A and a quantity of water of 10 ml. per 400 cm.$^2$. Twenty-one days after treatment, the germination and condition of Panicum, as well as the development and condition of Oryza were evaluated, with the following results:

| Concentration of active substance: | Dosage, kg. of active substance/ha. | Panicum | Oryza |
|---|---|---|---|
| 0.05 | 1.25 | Highly germinated | No impairment at all; rather better than in the control dishes. |
| 0.1 | 2.5 | Only a small portion germinated, severely necrotic. | |
| 0.2 | 5.0 | Not germinated | |
| 0.5 | 12.5 | ____do____ | |
| Control | 0 | Lush germination, partially overgrowing Oryza. | Strongly inhibited by Panicum. |

| Plant | Active Substance | Concentration of active substance in percent | | | |
|---|---|---|---|---|---|
| | | 0.001 | | 0.01 | |
| | | W | S | W | S |
| Lepidium | A | 0 | 1 | 1 | 2 |
| | B | 0 | 0 | 0 | 0 |
| | C | 0 | 0 | 0 | 0 |
| | D | 0 | 0 | 0 | 1 |
| | E | 0 | 0 | 1 | 0 |
| Avena | A | 0 | 0-1 | 3 | 1-2 |
| | B | 0 | 0 | 0 | 0-1 |
| | C | 0 | 0 | 0 | 0 |
| | D | 0 | 0 | 0 | 1 |
| | E | 0 | 0-1 | 1 | 1 |

In connection with effective agents A and B, phytotoxic damage was not observed in any case. However, in case of Lepidium, the effective agents C and E, when employed in a high concentration, caused weak chloroses, and the effective agent D caused severe chloroses.

EXPERIMENT 2

Respectively, 10 seed grains of radish (*Raphanus sativus*) and cucumber (*Cucumis sativus*) are sown into paper cups filled with compost and covered with 1 cm. of sand. On the following day, respectively 25 ml. of an aqueous dilution of a 25% emulsion concentrate (substance A) and an aqueous solution (substances B, C and D) of the effective agents were poured on the surface of each cup (about 50 cm.$^2$). The effective agent is flushed into the soil by the large amount of water. Fourteen days after treatment, growth and condition of the young plants (shoot) were evaluated as in Experiment 1.

| Plant | Active substance | Concentration of active substance in percent | |
|---|---|---|---|
| | | 0.004 | 0.04 |
| Raphanus | A | 1 | 2 |
| | B | 0 | 1 |
| | C | 0 | 1 |
| | D | 0 | 1 |
| Cucumis | A | 1 | 2 |
| | B | 0 | 1 |
| | C | 0 | 1 |
| | D | 0 | 0 |

No phytotoxic damage was observed with the concentrations employed herein.

Experiments 1 and 2 demonstrate how the active agents gently inhibit the longitudinal growth of the germinating seedlings. In this connection, the active substance according to the invention (A) is distinguished, as compared to the commercial products B to E, by an increased efficacy and a decreased selective phytotoxicity.

EXPERIMENT 3

Young rice plants (*Oryza sativa*) were planted, in the 3- to 4-leaf stage, in dishes (mixture of compost/sandy loam 1:1). One week thereafter, the dishes were seeded with millet (*Panicum crus-galli*), and one day thereafter, Corresponding experiments with a scattering agent on sand brought similar results.

Similarly favorable results are obtained even if Oryza and Panicum are seeded simultaneously and are treated directly or soon after seeding of the soil, or if seeding simultaneously into the previously treated soil (pre-sowing treatment of the soil). This is important for the direct sowing process of Oryza which has gained importance over the planting method.

This example shows that this invention is effective as a selective soil herbicide against grass overgrowth in rice cultures.

EXPERIMENT 4

Six-year old apple trees (Cox-Orange-Renette) were sprayed so that they were dripping wet, both at the time of the June shoots (new growth) and in the first half of September, with respectively 1 liter per tree of an aqueous emulsion comprising 75% water and 25% of emulsion concentrate of substance A. The concentrations of preparations listed in the following table were applied in part without any of the customary nonionic wetting agents and in part with the addition of one of these agents. Fourteen days (June spraying) and 21 days (September spraying), respectively, after treatment, the foliage was evaluated.

Spray concentration in percent:      Foliage:
    0.125 _____ Up to 50% defoliation.
    0.25 _____ 66 to 75% defoliation.
    0.5 _____ At least 95% defoliation.
    0.25+0.5% wetting
      agent _____ At least 95% defoliation.
    Control (water only) __ No defoliation.

The preceding results confirm the efficacy of substance A as a mild defoliant. Moreover, it is demonstrated that the defoliating effect can be substantially improved by the simultaneous use of wetting agents, especially wetting agents of the types commonly used in the formulation of pesticides and belonging to the classes of anionic, cationic, and non-ionogenic wetting agents as defined more specifically below.

The novel compounds of this invention are also suitable for combination preparations with conventional herbicides in order to obtain a wide spectrum of activity. Thus, in some cases, the amounts of one or both herbicides can be lowered, whereas in other combinations, undesired side effects, e.g. phytotoxicity, poor compatibility with rice, excessive duration of effectiveness in the soil or in the plant, can be suppressed. In many cases, the combination results in an increased favorable period for application, increased long-term effectiveness, and increased spectrum of activity. In particular, the compounds of Formula I can also be combined with growth-promoting herbicides and/or with growth regulators or morphoregulators. Suitable for combination preparations include, but are not limited to, compounds set forth in the following table:

COMPOUNDS FOR COMBINATION PREPARATIONS

Known substituted phenoxyalkanoic acids and the derivatives thereof, particularly the esters and salts thereof, e.g. 2,4-dichlorophenoxyacetic acid, α-2,4 - dichlorophenoxypropionic acid, γ-2,4-dichlorophenoxybutyric acid, 2-methyl - 4 - chlorophenoxyacetic acid, α-4-chloro-2-methylphenoxy-propionic acid, γ - 2-methyl-4-chlorophenoxybutyric acid, 2,4,5-trichlorophenoxyacetic acid, α-2,4,5-trichlorophenoxypropionic acid, γ-2,4,5-trichlorophenoxybutyric acid, as well as their sodium, potassium, ammonium, methyl-, dimethyl-, trimethyl-, ethyl-, diethyl, triethyl-, n-propyl-, di-n-propyl-, tri-n-propyl-, n-butyl-, di-n-butyl- and tri-n-butyl-ammonium, mono-, di- and triethanolammonium, long-chain tert.-alkyl-ammonium salts (primenes) and oleylpropylenediammonium salts and the methyl, ethyl, n-propyl, isopropyl, n-butyl, n-hexyl, 2-ethylhexyl, allyl, benzyl and 2-butoxyethyl esters thereof; triazines, such as 2-chloro - 4,6 - bis-(diethylamino)-, 2-chloro-4,6-bis-(ethylamino)-, 2 - chloro-4-ethylamino-6-isopropylamino-, 2 - chloro-4,6-bis-(isopropylamino)-, 2-methoxy-4,6-bis-ethylamino-, 2 - methoxy-4-ethylamino-6-isopropylamino-, 2 - methoxy-4,6-bis-(isopropylamino)-, 2-methylmercapto-4,6-bis-(ethylamino)-, 2 - methylmercapto - 4 - ethylamino-6-isopropylamino-, 2-methylmercapto-4,6-bis-(isopropylamino)- and 2 - azido - 4 - ethylamino - 6 - isopropylamino-1,3,5-triazine; urea derivatives, such as 3-phenyl-1,1-dimethyl-, 3-(p-chlorophenyl)-1,1 - dimethyl-, 3-m-trifluoromethylphenyl-1,1-dimethyl-, 3-(3,4-dichlorophenyl)-1,1 - dimethyl-, 3 - [p-(p-chlorophenoxy)-phenyl]-1,1-dimethyl-, 1 - n - butyl-3-(3,4-dichlorophenyl) - 1 - methyl-, 3 - (3,4 - dichlorophenyl)-1-methoxy - 1 - methyl-, 3-(p-chlorophenyl) - 1 - methoxy-1-methyl-, 3 - (p-bromophenyl)-1-methoxy-1-methyl-, 3-[5 - (3a,4,5,6,7,7a-hexahydro-4,7 - methanoindanyl]-1,1-dimethyl-, 1 - cyclo-octyl-3,3-dimethyl- and 1,3-bis-(2,2,2-trichloro-1-hydroxyethyl)-urea; phenols and cresols such as pentachlorophenol, 4,6-dinitro-2-sec.-butylphenol, 4,6-dinitro-o-cresol or 3,5-diiodo-4-hydroxybenzonitrile and the optionally substituted ammonium salts thereof; phenoxyalkyl esters, such as the sodium salt of 2,4-dichlorophenoxyethyl sulfate, the sodium salt of 2-methyl-4-chlorophenoxyethyl sulfate, the sodium salt of 2,4,5-trichlorophenoxyethyl sulfate, 2,4-dichlorophenoxyethyl benzoate, 2-(2,4,5-trichlorophenoxy)-ethyl - 2,2-dichloropropionate, tris-(2,4 - dichlorophenoxyethyl)-phosphite; β-naphthoxyacetic acid; substituted benzoic acids and other arylcarboxylic acids, as well as aryl-alkanoic acids and the derivatives thereof, such as 2,3,6 - trichlorobenzoic acid, 2,3,5,6 - tetrachlorobenzoic acid, 2,3,5,6 - tetrachloro-4-[(methylthio)-carbonyl]-benzoic acid methyl ester, polychlorobenzoic acids, 2,3,5 - triiodobenzoic acid, 2,4-dichloro-3-nitrobenzoic acid, 3 - amino-2,5-dichlorobenzoic acid, 2-methoxy - 3,6 - dichlorobenzoic acid, 2-methoxy-3,5,6 - trichlorobenzoic acid, 2,6-dichlorobenzonitrile, 2-chloro-6-methylbenzonitrile, 2,4,6 - trichlorobenzonitrile, 2,3,6-trichlorophenylacetic acid, 2,3,6 - trichlorophenylacetamide, 1 - naphthylacetic acid; arylphthalamic acids and the derivatives thereof, such as N-naphthyl-(1)-phthalamic acid, N-naphthyl-(1)-phthalimide and the disodium salt of 3,6 - endoxohexahydrophthalic acid; N-phenylcarbamic acids and the derivatives thereof, such as isopropyl-N-phenyl-carbamate, isopropyl - N - 3 - chlorophenyl-carbamate and 4-chloro - 2 - butynyl-(3-chlorophenyl)-carbamate; triazole derivatives such as 3-amino-1,2,4-triazole; halogenated fatty acids and the derivatives thereof, such as trichloroacetic acid, 2,2-dichloropropionic acid, 2,2,3-trichloropropionic acid, 2,2 - dichlorobutyric acid and propionic acid-3,4-dichloranilide; maleic acid hydrazide and derivatives thereof; N-dimethylaminosuccinamic acid; thiol- and dithiocarbamates, such as 2-chloroallyl-diethyldithiocarbamate, sodium - N - methyl-dithiocarbamate, N,N-di-n-propylthiolcarbamate, 2,3-dichloro- and 2,3,3-trichloroallyl-diisopropylthiolcarbamate, as well as the 5-ethyl ester of hexahydroazepine-thiocarboxylic acid-(1); dipyridylium derivatives, such as 1,1'-ethylene-2,2'-dipyridylium dibromide, 1,1' - dimethyl-4,4'-dipyridylium dichloride and -dibromide; pyridazones, such as 1-phenyl-4-amino-5-chloro-6-pyridazone; uracils, such as 5-bromo - 3 - isopropyl-6-methyl uracil or 3-n-butyl-6-methyl uracil; indole-3-alkanecarboxylic acids and the derivatives thereof, such as β-indolylacetic acid, β-indolylacetamide, β-indolylacetonitrile and β-indolylbutyric acid; gibberellins $A_1$–$A_{14}$ and the derivatives thereof, particularly gibberellic acid (gibberellin A 3); kinins and the derivatives thereof, such as 6 - (2-furfuryl)-aminopurine; quaternary nitrogen and phosphorus compounds, such as β-chloroethyltrimethylammonium chloride, (4-hydroxy-5-isopropyl - 2 - methylphenyl)-trimethylammonium chloride, [5 - isopropyl-2-methyl-4-(piperidino-carbonyloxy)-phenyl]-trimethylammonium chloride or 2,4 - dichlorobenzyl-tributylphosphonium chloride; aryl ethers, such as 3,4 - dichloro-4'-nitrodiphenyl ether; arylboric acids and the derivatives thereof, such as phenylboric acid; growth stimulants, such as urea and purine derivatives, such as adenine; morphoregulators, such as fluorene-9-carboxylic acid and the derivatives thereof, e.g. 2-chloro-, 2-bromo- and 2,7-dichloro-9-fluorenol-9-carboxylic acid, as well as the salts and esters thereof.

From a preferred standpoint, combination preparations comprise, in addition to a compound of Formula I, at least one compound from the following groups of active agents: Growth-promoting herbicides from the group of the substituted phenoxy-alkanecarboxylic acids or the derivatives thereof; morphoregulators from the group of fluorene-9-carboxylic acid and the derivatives thereof, respectively; substituted phenols, triazines and/or ureas.

By means of the novel compounds of this invention, the problem of grasses (weedy grass) can be solved in many cultures. Examples of such cultures are the following: Grains, such as rice (*Oryza sativa*), maize (corn) (Zea Mays), wheat (*Triticum sativum*), barley (*Hordeum sativum*), oats (*Avena sativa*), rye (*Secale cereale*), millet (*Sorghum vulgare*), buckwheat (*Fagopyrum sagittatum*); grass cultures; potatoes, turnips and cabbage [truck crops] and root crops, such as turnip (*Beta vulgaris*), potato (*Solanum tuberosum*), cassava (*Manihot esculenta*), yams (Dioscorea spec.), sweet potato (*batatas, Impomea batatas*); vegetables, such as onion (*Allium cept*), lettuce (*Lactuca sativa*), tomato (*Lycopersicon esculentum*) celery (*Apium graveolens*), cucumber (*Cucumis sativus*), melon (*Cucumis melo*), cabbage (*Brassica oleracea*), asparagus (*Asparagus officinalis* var. *altilis*), carrot (*Daucus carota* ssp. *sativa*), spinach (*Spinacia oleracea*), eggplant (Aubergine; *Solanum melongena*), Konnyaku (*Amorphophalus conjac*); leguminous plants, such as soybean (*Glycine soja*), peanut (*Arachis hypogaea*), bean (*Phaseolus vulgaris*), pea (*Pisum sativum, Pisum arvense*), lentil (*Lens esculenta*), clover (*trifolium* sp.), alfalfa (*Medicago sativa*); oil-yielding plants, e.g. rape (*Brassica napus oleifera*), rapeseed (*Brassica rapa oleifera*), coconut palm (*Cocos nocifera*), oil palm (*Elaeis guineensis*), sunflower (*Helianthus annuus*), linseed (*Linum usitatissimum*), olive (*Olea europea*), sesame (*Sesamum indicum*); fruits, such as apple (Malus sp.), pear (*Pyrus communis*), quince (*Cydonia oblonga*), cherry (*Prunus cerasi*), peach (*Prunus persica*), plum (*Prunus domesticus*), apricot (*Prunus armeniaca*), almond (*Prunus amygdalus*), strawberry (*Fragaria* sp.), currant (*Ribes* sp.), gooseberry (*Ribes grossularia*), raspberry (*Rubus idaeus*), loganberry (*Rubus fructicosus, R. idaeus*), hazelnut (*Corylus avellana*), walnut (*Juglans regia*), citrus fruits (orange, tangerine, lemon, grapefruit; Citrus sp.), pineapple (*Ananas comosus*), banana (Musa sp.), avocado (*Persea americana*), mango (*Mangifera indica*), date (*Phoenix dactylifera*), fig (*Ficus carica* sp.), Khaki (*Diospyros khaki*), grapevine (Vitis sp.); fiber-yielding plants such as cotton (Gossypium sp.), flax (*Linum usitatissimum*), hemp (*Cannabis sativa*), jute (*Corchorus capsularis, Corchorus olitorius*), kapok (*Ceiba pentandra*), sisal (Agave sp.); decorative plants, such as Rose (Rosa sp.), carnation (Dianthus sp.), cyclamen (*Cyclamen europaeum*), chrysanthemum (Chrysanthemum sp.), gladiola (Gladiolus sp.), tulip (Tulipa sp.); furthermore, coffee (*Coffea arabica*), tea (*Thea sinensis*), cocoa (*Theobroma cacao*), sugar cane (*Saccharum officinarum*), bamboo (Bambusa sp.), hops (*Humulus lupulus*), natural rubber (*Hevea brasiliensis*), tobacco (Nicotiana sp.); as well as cultures of herbs and deciduous and coniferous trees.

Preferred active agents are especially those of Formula I wherein (A) R and R', being identical or different, represent straight-chain or branched alkyl or alkenyl residues of up to 18 carbon atoms, each of which can be optionally mono- or polysubstituted by halogen, CN, COZ, lower alkoxy, acyl, acyloxy or alkylmercapto, NH-acyl, $N(R_3)_2$ and/or Ar; or alkynyl residues of 2–6 carbon atoms which can optionally be mono- or disubstituted by halogen;

Ar represents an aryl residue of 6–10 carbon atoms which can optionally be mono- or polysubstituted by $NO_2$, halogen, CN, $R_3$, $OR_3$ and/or $CF_3$;

Z represents $OR_3$, $NH_2$, $NHR_3$ or $N(R_3)_2$; and $R_3$ is an alkyl residue of 1–4 carbon atoms;

(B) R and R', being identical or different, represent alkyl or alkenyl residues of respectively up to 12 carbon atoms optionally mono- or polysubstituted by F, Cl, Br, CN, COZ, $CH_3CO$, $C_2H_5CO$, $C_6H_5CO$, $CH_3S$, $C_2H_5S$, $NHCOR_3$, $C_6H_5$, chlorophenyl, nitrophenyl or trifluoromethylphenyl, or alkynyl residues of 2–6 carbon atoms optionally mono- or disubstituted by halogen; and Z and $R_3$ have the meanings indicated in connection with (A);

(C) R and R', being identical or different, represent primary or secondary alkyl, alkenyl or alkynyl of up to 6 carbon atoms, optionally substituted by 1 or 2-chlorine atoms, but wherein R and R' do not simultaneously represent methyl or allyl;

(D) R and R', being identical or different, represent primary or secondary alkyl of 2–6 carbon atoms.

Accordingly, R, R' and $R_3$ can represent the following: methyl, ethyl, n-propyl, isopropyl, n-, sec.- and tert.-butyl or isobutyl; R and R' can also be amyl, hexyl, heptyl, octyl, nonyl, decyl, undecyl, dodecyl, tridecyl tetradecyl, pentadecyl, hexadecyl, heptadecyl and octadecyl, as well as the isomers of these residues.

Preferred unsaturated aliphatic alkenyl residues are vinyl, alkyl, 2-butenyl, 3-butenyl, 2-methylallyl, 2,2-dimethylallyl, 4-methyl-2-pentenyl, 3-heptenyl and 10-undecylenyl; and preferred alkynyl residues are propargyl, 3-butynyl and 3-hexynyl.

The above-mentioned residues can be substituted in each case by halogen, particularly chlorine, but also by fluorine, bromine and/or iodine. Typical halogenated alkyl, alkenyl and alkynyl residues are preferably substituted at the 1-position or ω-position by halogen, particularly chlorine, such as chloromethyl, 1- or 2-chloroethyl, 1- or 3-chloropropyl, 1- or 4-chlorobutyl, 1- or 5-chloropentyl, 1- or 6-chlorohexyl, 1- or 18-chlorooctadecyl, 1-methyl-2-chloroethyl, furthermore fluoromethyl, 1- or 2-fluoroethyl, 3-fluoropropyl, 4-fluorobutyl, 5-fluoropentyl, 6-fluorohexyl, bromomethyl, 1- or 2-bromoethyl, 1- or 3-bromopropyl, 1- or 4-bromobutyl, 1- or 5- bromopentyl, 1- or 6-bromohexyl, iodomethyl, 1- or 2-iodoethyl, 4-chloro-3-butenyl, 6-chloro-3-hexynyl. Residues which are polysubstituted by halogen are, for example: 2,2,2-trifluoroethyl, 2,2,2-trichloroethyl, 2,3-dichloropropyl, 3,4-dichlorobutyl, 2,2,2-tribromoethyl, 2,3-dibromopropyl, 3,4-dibromobutyl.

Insofar as the residues R and R', respectively, are substituted by CN, the preferred residues are cyanomethyl, 2-cyanoethyl and 3-cyanopropyl.

Typical COZ-substituted residues include carbomethoxymethyl, carbethoxymethyl, 2-carbethoxyethyl, carbamoylmethyl, 2-carbamoylethyl, methylaminocarbonylmethyl, 2-methylaminocarbonylethyl, ethylaminocarbonylmethyl, 2-ethylaminocarbonylethyl, dimethylaminocarbonylmethyl, 2 - dimethylaminocarbonylethyl, diethylaminocarbonylmethyl, 2-diethylaminocarbonylethyl.

Lower alkoxy and lower alkylthio residues include, but are not limited to, methoxy, ethoxy, propoxy and butoxy as well as methylthio and ethylthio.

Preferred acyl residues are derived from hydrocarbon carboxylic acids of 2–8 carbon atoms: acetyl, propionyl, and benzoyl. Characteristic acyloxy groups derived from the same acyl residues are preferably lower alkanoyloxy, such as acetoxy and propionyloxy, but benzoyloxy is also quite desirable.

Corresponding considerations respecting acyl apply with respect to the substituted amino groups. Preferred substituents in this connection are lower alkanoylamino of the formula $NHCOR_3$, such as acetylamino, propionylamino, butyrylamino and valerylamino, as well as dimethylamino and diethylamino.

The residues Ar can be optionally substituted by lower alkyl groups or alkoxy groups, important substituents being particularly the methyl, ethyl, propyl, isopropyl, methoxy and ethoxy groups. Preferred examples for residues Ar are: phenyl, o-, m- and p-tolyl, 1- or 2-naphthyl, and o-, m- and p-methoxyphenyl. Additional examples of Ar include, but are not limited to, o-, m- and p-nitrophenyl, 2,4-dinitrophenyl, o-, m- and p-fluorophenyl, o-, m- and p-chlorophenyl, 2,4- and 2,6-dichlorophenyl, p-bromophenyl, o-, m- and p-trifluoromethylphenyl, 2-chloro-4-trifluoromethylphenyl.

In general, it is preferred for R and R' to be substituted by not more than two substituents, except in the case of halogen where three are also preferred. When two substituents are present, they can be the same or different. Generally, it is preferred for R and R' to be identical.

From the standpoint of novelty alone, as compared to prior art chemical compounds in general, there are preferred compounds of Formula I wherein R and R' each is unsubstituted alkyl of 2–18 carbon atoms, unsubstituted alkenky of 2–18 carbon atoms, unsubstituted alkynyl of 2–6 carbon atoms, alkyl or alkenyl of not more than 18 carbon atoms substituted by at least one member selected from the group consisting of halogen, CN, COZ, lower alkoxy, acyl derived from a hydrocarbon carboxylic acid of 2–8 carbon atoms, acyloxy wherein the acyl portion is derived from a hydrocarbon carboxylic acid of 2–8 carbon atoms, (lower) alkylmercapto, NH-acyl wherein the acyl portion is derived from a hydrocarbon carboxylic acid of 2–8 carbon atoms $N(R_3)_2$ and Ar; or alkynyl of 2–6 carbon atoms substituted by 1–2 halogens;

Ar is unsubstituted hydrocarbon aryl of 6–10 carbon atoms or hydrocarbon aryl of 6–10 carbon atoms substituted by 1–2 members selected from the group consisting of $NO_2$, halogen, CN, $R_3$, $OR_3$ and $CF_3$; or by 3 halogens;

Z is $OR_3$, $NH_2$, $NHR_3$ or $N(R_3)_2$; and $R_3$ is alkyl of 1–4 carbon atoms; with the provision that not both R and R' are simultaneously allyl, benzyl, or carboxymethyl.

In addition to the compounds of Formula I set forth in the specific examples, a preferred class includes the following:

3-chloromethylmercapto-5-methylmercapto-,
3-fluoromethylmercapto-5-methylmercapto-,
3,5-bis-(bromomethylmercapto)-,
3,5-bis-(methoxymethylmercapto)-,
3,5-bis-(acetylaminomethylmercapto)-,
3,5-bis[2-(3',5'-dinitrophenyl)-ethylmercapto]-,
3,5-bis-[2-(trifluoromethylphenyl)-ethylmercapto]-, 3,5-bis-[2-(diethylamino)-ethylmercapto]-isothiazole-4-carbonitrile.

The compounds of Formula I can be prepared, for example, by treating an isothiazolecarboxylic acid amide of the following Formula II with an agent capable of splitting off water:

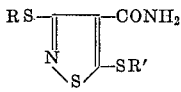

II wherein
R and R' have the above-indicated meanings; or by reacting with an alkylating agent a mercaptide of Formula III:

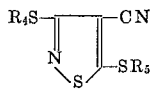

III wherein
at least one of the residues $R_4$ and $R_5$ represents an equivalent of a salt-forming cation; and
$R_4$ can also represent R and $R_5$ can also represent R'; or by reacting a compound of Formula IV:

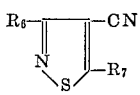

IV wherein
at least one of the residues $R_6$ and $R_7$ represents Cl, Br, I, or a reactively esterified OH group, with $R_6$ can also be RS, and $R_7$ can also be R'S, with a mercaptide of Formula V:

$$R_8\text{—SM} \qquad (V)$$

wherein
$R_8$ (in case $R_7=$R'S) is R, and otherwise R'; and
M is an equivalent of a salt-forming cation; and/or by converting, if desired, in a compound of Formula I the substituent or substituents R or R' in a conventional manner into other substituents R or R'.

The process of condensing out water from the isothiazolecarboxylic acid amide of Formula II is conventionally conducted in a particularly advantageous manner with phosphorus oxychloride, but there also can be used thionyl chloride, phosphorus trichloride, and other dehydration agents customarily employed for the preparation of nitriles from acid amides. Normally, the reaction is conducted in the presence of an inorganic or organic base, such as sodium or potassium carbonate, sodium or potassium bicarbonate, calcium oxide, triethylamine, dimethyl aniline, pyridine or collidine. Suitable solvents for the reaction are the usual inert organic solvents, particularly aromatic hydrocarbons, such as benzene, toluene or xylene, and furthermore, for example, ketones, such as acetone; chlorinated hydrocarbons, such as chloroform or carbon tetrachloride, or mixtures of such solvents. It is also possible to employ an excess of the dehydrating agents and/or of the added base (e.g., pyridine) without utilizing an additional inert solvent.

The reaction takes place at temperatures between 0° C. and the boiling point of the solvent employed, normally between room temperature and 140° C., and the reaction times range approximately between 1 and 48 hours.

The reaction products can be isolated in a simple manner; generally, the only major step is to distill off the solvent, whereupon the desired substance is obtained at a satisfactory degree of purity after treatment with water.

The compounds of Formula I are also obtainable by treating a mercaptide of Formula III with an alkylating agent.

Suitable salt-forming cations in the mercaptides III are alkali metal ions, alkaline earth metal ions, heavy metal ions or optionally substituted ammonium ions. Preferred are the sodium and potassium mercaptides. Furthermore suitable as the alkaline earth metals, are magnesium and barium, and as heavy metals mercury and lead.

The expression "alkylating agent" within the scope of the present invention is to be understood to comprise all agents suitable for the introduction of the residues R or R', i.e., alkenylating, alkynylating and aralkylating agents, etc. Especially suitable alkylating agents are those of the formulae R—X and R'—X wherein X represents Cl, Br, I or a reactively esterified OH group, particularly an equivalent of a sulfuric acid or sulfonic acid (methanesulfonic, benzenesulfonic, p-toluenesulfonic acid) ester. Accordingly, typical alkylating agents are, for example: alkyl halogenides, such as methyl chloride, ethyl chloride, propyl chloride, n-butyl chloride, allyl chloride, benzyl chloride, chloroacetonitrile, chloroacetic acid ethyl ester, chloroacetic acid methyl ester, chloroacetamide, and the nitrogen-alkylated derivatives thereof, such as N,N-diethyl-chloroacetamide, phenacyl chloride, chloroacetone, as well as the corresponding bromine (e.g., methyl or ethyl bromide) and iodine compounds (e.g., methyl or ethyl iodide), as well as the sulfuric acid esters (e.g., dimethyl sulfate, diethyl sulfate) and sulfonic acid esters (e.g., methane- or p-toluenesulfonic acid ethyl ester) of the basic alcohols.

The mercaptides of Formula III, advantageously prepared in situ, are alkylated in a conventional manner in inert solvents, such as lower alcohols, e.g., methanol, ethanol, isopropanol, or the mixtures thereof with water; in ethers, such as diethyl ether, tetrahydrofuran or dioxane; in hydrocarbons, such as benzene, toluene, xylene or petroleum ether. The reaction is conducted at temperatures between about −20° C. and the boiling point of the solvent or solvent mixture employed. If the starting material is a mercaptide of Formula III wherein both residues $R_4$ and $R_5$ represent equivalents of salt-forming cations, then the mercapto group in the 3-position is first reacted. If products of Formula I are to be prepared wherein the residues R and R' are different from each other, a dimercaptide of Formula III is accordingly first reacted, advantageously, with one mole of an alkylating agent corresponding to the residue R. If this step is conducted in an aqueous-alcoholic solution, then the dialkylated by-product of Formula I (R=R'), which is undesired in this case, and which is less soluble than the first-desired monoalkylated product, can readily be separated by filtration.

The filtrate where there is dissolved the monoalkylated product of the formula:

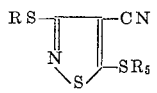

V wherein $R_5$ represents an equivalent of a salt-forming cation, is subsequently treated with an alkylating agent corresponding to the residue R'.

As a further technique, the isothiazoles of Formula I can be obtained by reacting a compound of Formula IV with a mercaptide of Formula V. This reaction, wherein the mercaptide V can also be advantageously formed from the basic mercaptan and a base, such as sodium, potassium, barium or calcium hydroxide in situ, is normally conducted under the same conditions as the alkylating of the mercaptide III. The conditions of these reactions do not differ fundamentally from those described in the literature for the reaction of halogen compounds with mercaptans to form thioethers.

Basically, the methods employed for these reactions are described in Houben-Weyl, "Methoden der Organischen Chemie" [Methods of Organic Chemistry] Georg-Thieme Publishers, Stuttgart (1955), vol. 9, pp. 103 et seq.

Furthermore, it is possible to convert any substituents R or R' present in a compound of Formula I in a conventional manner into other substituents R or R'. Thus, it is possible, by usual halogenation (e.g., chlorination with chlorine; bromination with bromine), to introduce halogen atoms into the substituents R or R'. Depending upon the amount of halogenating agent employed and upon the reaction conditions (temperature, catalysts), it is possible, in accordance with known technology, to introduce one or several halogen atoms. On the other hand, it is possible, for example, to convert halogen atoms present in the residues R or R' into: Nitrile groups by reaction with metallic cyanides; alkoxy groups by reaction with alcoholates; alkyl-mercapto groups by reaction with alkylmercaptides; or into $N(R_3)_2$ groups by reaction with secondary amines.

Many of the starting compounds of Formulae II, III and IV are known, and if not, can be produced analogously to the known compounds. The amides II, for example, are obtainable by alkylation optionally multistage of the salts (particularly the disodium salt) of the 3,5-dimercaptoisothiazole-4-carboxylic acid amide, which salts can be prepared, in turn, by reacting cyanoacetamide with carbon disulfide in the presence of a base to form salts of dimercaptomethylene cyanoacetamide and subsequent reaction with sulfur. The mercaptides III can be produced analogously by reaction of malonic acid dinitrile with carbon disulfide and sulfur.

Reacting chlorine or bromine with the salts of dimercaptomethylene-malonic acid nitrile results in the nitriles of Formula IV ($R_6$ and $R_7$=Cl or Br).

The novel compounds of the invention can be formulated into all conventional forms of application employed for plant protective or herbicidal agents.

Thus, the active agents can be employed in solid or liquid form with the addition of the customary carriers, fillers and/or auxiliary substances, as sprayable and/or dusting agents, as solutions, emulsions, suspensions and aerosols.

In detail, examples for additives include but are not limited to:

Carriers or fillers (i.e. pulverulent solids), such as bole, kaolin, siliceous chalk (a mineral existing in nature, consisting of kaolinite and quartz), bentonite, ground slate, pyrophyllite, talc, montmorillonite, chalk, dolomite, mica, silicic acid, aluminum or calcium silicate, kieselguhr, or ground walnut shells;

Wetting agents, there being suitable, depending upon the purpose of application, anionic, cationic, or nonionic surfactants, in detail soaps, such as sodium laurate; alkyl sulfates or sulfonates, such as sodium dodecyl sulfate or sulfonate; sulfonated and sulfated ethers; sulfonated alkyl fatty acid esters; sulfonated glycol fatty acid esters; quaternary ammonium salts, such as trimethylammonium iodide; amines and amides having a longer aliphatic chain; monoethers of polyglycols with long-chain aliphatic alcohols, such as the reaction products of ethylene oxide or polyethylene glycol with higher aliphatic alcohols; monoesters of polyglycols with fatty acids, e.g. oleic acid; monoethers of polyglycols with alkylated phenols; partially esterified polyvalent alcohols, such as sorbitan trioleate; partially or completely esterified polyglycol ethers of polyvalent alcohols, such as the tristearic acid ester of the polyglycol ether of sorbitan;

Binders and dispersing agents, such as cellulose and the derivatives thereof, e.g. methyl, ethyl, hydroxypropyl or carboxymethyl cellulose, tragacanth, pectins, gum arabic; and Solvents, e.g., hydrocarbons, such as cyclohexane, xylene, solvent naphtha (aromatic hydrocarbon mixtures with boiling points between 150 and 180° C.), petroleum, particularly petroleum fractions having boiling points between 80 and 200° C., tetrahydronaphthalene, decahydronaphthalene; aliphatic alcohols, such as methanol, ethanol, isopropanol, isobutanol, n-butanol or hexanol; glycol ethers, such as methyl glycol, ethyl glycol; ketones, such as acetone, methyl ethyl ketone, diethyl ketone, methyl isobutyl ketone, isophorone, cyclohexanone, methylcyclohexanone, dioxane; dimethyl formamide, N-methyl-pyrrolidone; dimethyl sulfoxide; and acetonitrile.

Mixtures of the above-mentioned additives can likewise be employed. Emulsion concentrates can be marketed commercially as such, but before use, the emulsion concentrates are conventionally diluted with water. If compositions are employed containing, as active components, one or several water-soluble substances, it is, of course, possible to employ water as the solvent or diluent for the production of the concentrate.

The total content of active agents in these compositions ranges generally between 1 and 95%, preferably between 20 and 80%. In combination preparations, the proportion of the compounds of the present invention in the total proportion of active agents is normally between 0.5 and 90%, preferably between 10 and 60%. The amount to be employed is between 1 and 100 kg./ha., preferably between 3 and 20 kg./ha.—the optimum amounts depending on the desired effect, the climatic conditions, and the type and character of the plants to be treated. Thus, for example, with the use of an amount of 4–8 kg. of 3,5 - diethylmercapto - isothiazole - 4 - carbonitrile per hectare, very good results were achieved, particularly before germination of the weeds as well as in open-field practice.

The active agents can be utilized by soil treatment in the pre-sowing or pre-germination method, or by plant treatment in the post-germination method, namely by atomizing, spraying, pouring, scattering, dusting, furthermore by rubbing, powdering, injecting, infiltrating or soaking plants or plant parts, such as tubers, bulbs or seeds, as well as by incorporation into the culture substrate.

The novel compounds are to be employed in the pesticide field. Particularly advantageous is their use as herbicides. However, they can also be employed as anthelmintics, fungicides, miticides, nematocides, and microbicides, especially bactericides; in this connection, they can also be used in each case in combination with other active substances.

When employed as herbicides against monocotyledonous weeds in rice, it is desired that active agents provide effective control of the germinating and earlier growth stages of the grasses, since the rice suffers to an extremely high degree under the pressure of the weeds directly after germination or planting. Whereas the active agents of the invention can accomplish the task, the active agents previously employed most frequently (phenoxyalkanecarboxylic acids) for protecting rice crops, can be utilized only at a later stage, namely, in the shoot-forming stage of the rice, since otherwise damage to the panicle would occur.

Without further elaboration, it is believed that one skilled in the art can, using the preceding description utilize the present invention to its fullest extent. The following preferred specific embodiments are, therefore, to be construed as merely illustrative, and not limitative of the remainder of the specification and claims in any way whatsoever.

In the following examples directed to formulations, all percentages are by weight unless otherwise indicated.

Examples 1–5 are sprayable powders.

Example 1

| | Percent |
|---|---|
| 3,5-diethylmercapto-isothiazole-4-carbonitrile | 25 |
| Sodium-dialkylnaphthalene sulfonate | 1 |
| Silicic acid | 12 |
| Sulfite waste liquor powder | 15 |
| Bole | 47 |

Example 2

| | Percent |
|---|---|
| 3,5-diethylmercapto-isothiazole-4-carbonitrile | 10 |
| 2,4-dichlorophenoxyacetic acid isooctyl ester | 30 |
| Oleic-acid-N-methyl tauride | 8 |
| Silicic acid | 52 |

Example 3

| | Percent |
|---|---|
| 3,5-diethylmercapto-isothiazole-4-carbonitrile | 20 |
| Pentachlorophenol | 20 |
| Sodium-alkyl benzenesulfonate | 1 |
| Sulfite waste liquor powder | 13 |
| Precipitated aluminum silicate | 10 |
| Siliceous chalk (neutral mixture of fine quartz and kaolin | 46 |

Example 4

| | Percent |
|---|---|
| 3,5-diethylmercapto-isothiazole-4-carbonitrile | 35 |
| Atrazine (2 - chloro-4-ethylamino-6-isopropylamino-1,3,5-triazine) | 5 |
| Sodium-dialkylnaphthalenesulfonate | 0.5 |
| Sulfite waste liquor powder | 12 |
| Precipitated calcium silicate | 25 |
| Kaolin | 22.5 |

Example 5

| | Percent |
|---|---|
| 3,5-diethylmercapto-isothiazole-4-carbonitrile | 20 |
| 3-(3,4 - dichlorophenyl)-1,1-dimethylurea | 20 |
| Sodium alkyl sulfate | 1 |
| Nonylphenol polyglycol ether | 5 |
| Precipitated calcium silicate | 15 |
| Bole | 39 |

Example 6

Emulsion concentrate:

| | Percent |
|---|---|
| 3,5 - diethylmercapto - isothiazole - 4 - carbonitrile | 37.5 |
| Dimethyl formamide | 12.5 |
| Solvent naphtha | 45 |
| Emulsifying agent (a mixture of 30% calcium dodecyl benzenesulfonate and the rest polyoxyethylene sorbitan esters of a mixture of fatty and resin acids) | 5 |

Example 7

Dispersion:

| | Percent |
|---|---|
| 3,5 - diethylmercapto - isothiazole - 4 - carbonitrile | 10 |
| 2-methyl-4-chlorophenoxyacetic acid triethanolammonium salt | 40 |
| Carboxymethyl cellulose | 1 |
| Alkyl phenol polyglycol ether | 2 |
| Bentonite | 1 |
| Water | 46 |

Example 8

Seed powder:

| | Percent |
|---|---|
| 3,5 - diethylmercapto - isothiazole - 4 - carbonitrile | 20 |
| Calcium silicate | 10 |
| Colophony | 2 |
| Bole | 68 |

Example 9

Emulsion concentrate:

| | Percent |
|---|---|
| 3,5 - diallylmercapto - isothiazole - 4 - carbonitrile | 40 |
| Dimethyl formamide | 12.5 |
| Solvent naphtha | 43 |
| Emulsifying agent (calcium dodecyl benzenesulfonate and polyoxyethylene sorbitan esters of a mixture of fatty and resin acids) | 4.5 |

Example 10

Sprayable powder:

| | Percent |
|---|---|
| 3,5 - diallylmercapto - isothiazole - 4 - carbonitrile | 28 |
| Sulfite waste liquor powder | 15 |
| Bole | 45 |
| Silicic acid | 11 |
| Sodium-dialkyl naphthalenesulfonate | 1 |

In place of 3,5-diethylmercapto-isothiazole-4-carbonitrile, in the preceding examples, it is also possible to employ other compounds of Formula I, formulated analogous or in a similar manner, in particular the following:

3,5-di-n-propylmercapto-,
3,5-diisopropylmercapto-,
3,5-di-n-butylmercapto-,
3,5-diisobutylmercapto-,
3,5-di-n-amylmercapto-,
3,5-di-n-hexylmercapto-,
3,5-di-n-heptylmercapto-,
3,5-di-n-octylmercapto-,
3,5-di-n-decylmercapto-,
3,5-di-n-dodecylmercapto-,
3,5-bis-(1-chloroethylmercapto)-,
3-methylmercapto-5-ethylmercapto-,
3-methylmercapto-5-n-propylmercapto-,
3-methylmercapto-5-isopropylmercapto-,
3-methylmercapto-5-n-butylmercapto-,
3-methylmercapto-5-isobutylmercapto-,
3-ethylmercapto-5-methylmercapto-,
3-n-propylmercapto-5-methylmercapto-,
3-isopropylmercapto-5-methylmercapto-,
3-n-butylmercapto-5-methylmercapto-, and
3-isobutylmercapto-5-methylmercapto-isothiazole-4-carbonitrile.

Examples for the preparation of the novel compounds:

Example A 99.2 g. of 3,5-diethylmercapto-isothiazole-4-carboxylic acid amide is suspended in 500 ml. of toluene. Under agitation, 30 g. of phosphorus oxychloride is introduced into the reaction suspension at room temperature; then, 48 g. of pyridine is added. With continuous agitation, the mixture is refluxed for 4 hours. Thereafter, the toluene soluene solution is poured off and cooled to 0° C. and during this step, a portion of the reaction product separates in crystalline form. The reaction mixture is vacuum filtered; the resultant filtrate is filtered through a layer of silica gel of a thickness of about 15 cm. (previously formed into a slurry with toluene), and washed with a small amount of toluene. After the toluene has been distilled off, there remains 88.4 g. of 3,5-diethylmercapto-isothiazole-4-carboxylic acid amides with phosphorus oxychloride:

Analogously, the following isothiazole-4-carbonitriles are obtainable by treating the corresponding isothiazole-4-carboxylic acid amides with phosphorus oxychloride:

3,5-di-n-propylmercapto-, M.P. 29–31° C., B.P. 172–173° C./1.5 mm.;
3,5-diisopropylmercapto-, M.P. 24–26° C., B.P. 150–152° C./1.5 mm.;
3,5-diisobutylmercapto-, undistillable oil;
3,5-di-n-butylmercapto-, undistillable oil;
3,5-di-n-amylmercapto-, undistillable oil;
3,5-di-n-hexylmercapto-, undistillable oil;
3,5-di-n-dodecylmercapto-, undistillable oil;
3,5-bis-(cyanomethylmercapto)-, M.P. 114–115° C.;
3,5-bis-(phenacylmercapto)-, M.P. 145–146° C.;
3,5-bis-(o-chlorobenzylmercapto)-, M.P. 64–65° C.;
3,5-bis-(acetylmethylmercapto)-, M.P. 100–101° C.;
3,5-bis-(1-chloroethylmercapto)-, B.P. 178–179.5° C./0.01 mm.;
3,5-bis-(diethylaminocarbonylmethylmercapto)-, M.P. 170–171° C.;
3-methylmercapto-5-phenacylmercapto-, M.P. 157–158° C.;
3-methylmercapto-5-propargylmercapto-, M.P. 89–94° C.;
3-ethylmercapto-5-phenacylmercapto-, M.P. 127–128° C.;
3-propargylmercapto-5-methylmercapto-, M.P. 67–68° C.;
3-acetylmethylmercapto-5-ethylmercapto-, M.P. 83–84° C.;
3-ethoxycarbonylmethylmercapto-5-methylmercapto-, M.P. 72–73° C.;

3-diacetylmethylmercapto-5-methylmercapto-, M.P. 130–131° C.;
3-[1-cyano-2,2-bis-(methylmercapto)-vinylmercapto]-5-cyanomethyl-mercapto-, M.P. 240° C. (decomposition);
3-carbamoylmethylmercapto-5-methylmercapto-, M.P. 167–168° C.;
3-cyanomethylmercapto-5-methylmercapto-, M.P. 140–141° C.;
3-diethylaminocarbonylmethylmercapto-5-methylmercapto-, M.P. 107–108° C.;
3-acetylmethylmercapto-5-methylmercapto-, M.P. 98–99° C.;
3-benzylmercapto-5-methylmercapto-, M.P. 86–77° C.;
3-o-chlorobenzylmercapto-5-methylmercapto-, M.P. 108–109° C.;
3-phenacylmercapto-5-allylmercapto-, M.P. 105–107° C.;
3-phenacylmercapto-5-methylmercapto-, M.P. 102–103° C.;
3-phenacylmercapto-5-ethylmercapto-, M.P. 84–86° C.;
3-benzylmercapto-5-cyanomethylmercapto-, M.P. 95–96° C.

Example B 21.8 g. of the disodium salt of 3,5-dimercapto-isothiazole-4-carbonitrile is dissolved in 250 ml. of 80% ethanol, mixed under agitation and within 30 minutes with 30.8 g. of diethyl sulfate, and the stirring is continued for 3 hours at 50–60° C. After the reaction mixture is cooled, the thus-precipitated, 3,5-diethylmercapto-isothiazole-4-carbonitrile is vacuum filtered and recrystallized from aqueous ethanol, M.P. 47–48° C.

Analogously, 3,5-di-n-hexylmercapto-isothiazole-4-carbonitrile is obtainable with n-hexyl bromide (this product is an undistillable oil).

Example C 21.8 g. of the disodium salt of 3,5-dimercapto-isothiazole-4-carbonitrile is dissolved in 200 ml. of methanol, and a solution of 10.9 g. of ethyl bromide in 15 ml. of methanol is added dropwise thereto with agitation. The reaction mixture is further stirred for 3 hours, mixed with 100 ml. of water, allowed to stand overnight at 0° C., and a small amount of 3,5-diethylmercapto-isothiazole-4-carbonitrile is then separated by vacuum filtration. The filtrate, wherein the sodium salt of 3-ethylmercapto-5-mercapto-isothiazole-4-carbonitrile is dissolved, is mixed under agitation with a solution of 20 g. of phenacyl bromide in 50 ml. of acetone, boiled for ½ hour, and concentrated, thus obtaining 3-ethylmercapto-5-phenacylmercapto-isothiazole-4-carbonitrile which is recrystallized from 90% ethanol, M.P. 127–128° C.

Example D (a) A solution of 17.9 g. of 3,5-dichloro-isothiazole-4-carbonitrile in 200 ml. of methanol is added dropwise under agitation to a mixture prepared from 12.4 g. of ethylmercaptan and 4.6 g. of sodium in 400 ml. methanol. The reaction mixture is boiled for one hour, mixed with water, the solution concentrated, allowed to cool, and the thus-obtained 3,5-diethylmercapto-isothiazole-4-carbonitrile is recrystallized from 90% ethanol, M.P. 47–48° C.

(b) 10 g. of 3,5-diethylmercapto-isothiazole-4-carbonitrile is dissolved in 250 ml. of carbon tetrachloride, and under stirring chlorine is introduced into the boiling solution for 10 hours. After the solvent has been distilled off, the residue is chromatographed on silica gel, and the thus-obtained oil is thereafter fractionally distilled. The fraction, boiling between 179.5 and 180.5° C. at 0.01 mm. consists of 3,5-bis-(1-chloroethylmercapto)-isothiazole-4-carbonitrile.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A compound of the formula

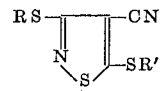

wherein R and R' each is primary or secondary alkyl of 2–6 carbon atoms.

2. A compound as defined by claim 1 wherein R and R' are identical.

3. A compound as defined by claim 1 wherein said compound is 3,5 - diethylmercapto - isothiazole - 4 - carbonitrile.

4. A compound as defined by claim 1 wherein said compound is 3,5-di-n-propylmercapto-isothiazole-4-carbonitrile.

5. A compound as defined by claim 1 wherein said compound is 3,5 - diisopropylmercapto - isothiazole - 4 - carbonitrile.

6. A compound as defined by claim 1 wherein said compound is 3,5 - di - n - butylmercapto - isothiazole - 4 - carbonitrile.

7. A compound as defined by claim 1 wherein said compound is 3,5 - diisobutylmercapto - isothiazole - 4 - carbonitrile.

8. A compound as defined by claim 1 wherein said compound is 3,5 - di - n - amylmercapto - isothiazole - 4 - carbonitrile.

9. A compound as defined by claim 1 wherein said compound is 3,5 - di - n - hexylmercapto - isothiazole - 4 - carbonitrile.

References Cited

UNITED STATES PATENTS 3,230,229   1/1966   Hatchard _____ 260—302

ALEX MAZEL, Primary Examiner

R. J. GALLAGHER, Assistant Examiner

U.S. Cl. X.R.

71—90; 260—299